United States Patent Office 3,302,235
Patented Feb. 7, 1967

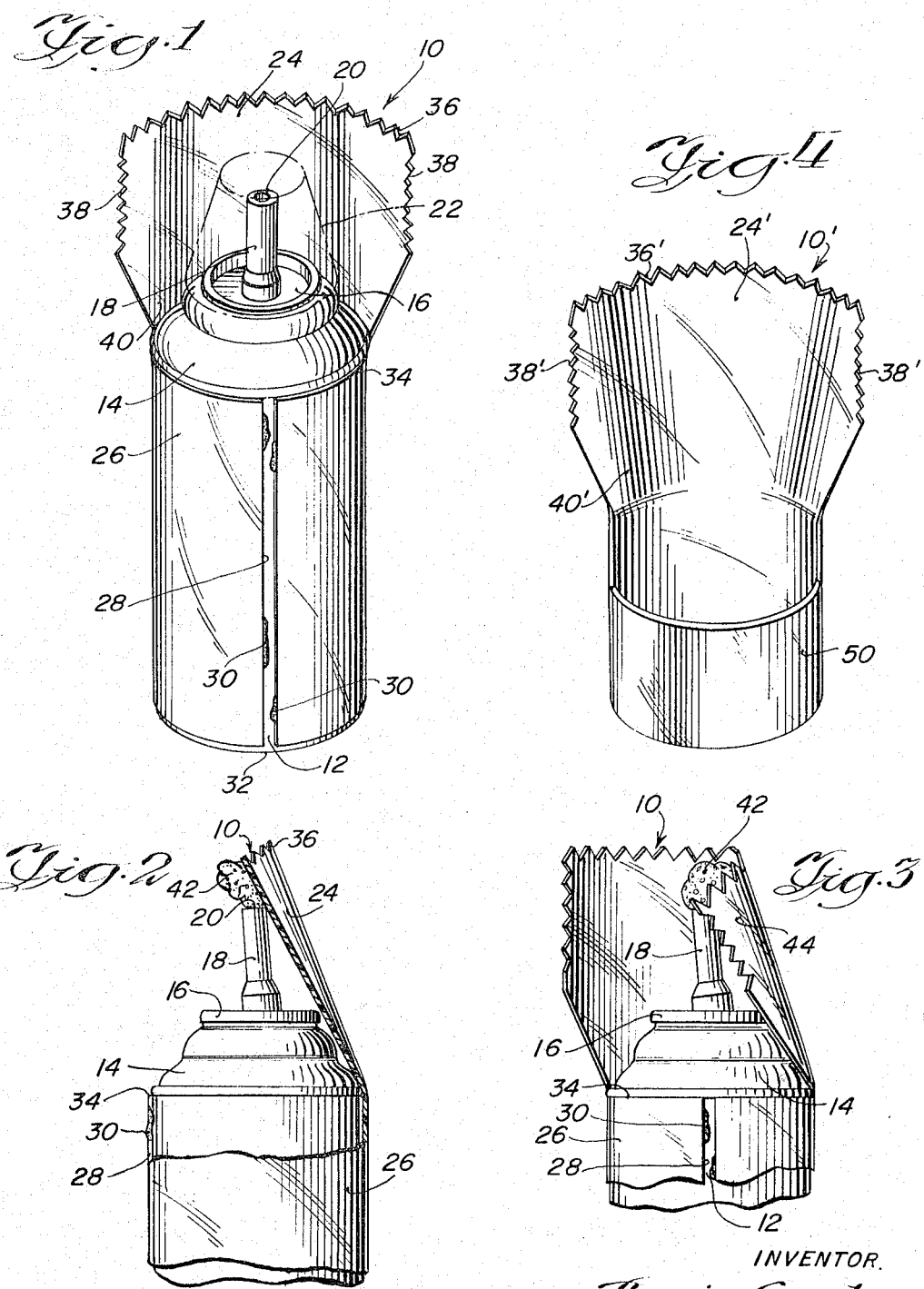

3,302,235
APPLICATOR ATTACHMENT FOR AEROSOL
SHAVING CREAM CONTAINER
Boris Gerber, 3807 W. Kenney Ave., Skokie, Ill. 60076
Filed Jan. 11, 1965, Ser. No. 424,588
7 Claims. (Cl. 15—552)

This invention relates to a novel applicator or spreader device adapted to be secured on the container for a pressurized shaving cream product for opening the dispenser valve of the pressurized container and receiving the shaving cream directly thereon for applying and spreading on the user's face.

An important object of the invention is to provide an attachment device of the character described having a sleeve or collar formation at one end thereof for mounting the device on the cylindrical body of the conventional pressurized container for shaving cream and having a flexible spreader positioned to be pressed against the dispenser valve of the container and to receive the shaving cream product discharged from the said valve.

Another important object of the invention is to provide a spreader attachment of the character described which has serrated edges for aiding in spreading of the shaving cream uniformly on the user's face.

Further objects of the invention are to provide a spreader attachment of the character described which is formed of an inexpensive flexible plastic material economically and simply for purposes of manufacture and installation on the container; which has a novel one-piece construction providing edges for spreading the shaving cream, which edges are of different length so that short length edges are available for reaching curved surfaces of the neck, especially below the user's chin; which is hygenically clean and capable of being maintained in such a condition; and which is efficient in use so that the user's hands need not come in contact with the shaving cream at any time.

The foregoing and other objects of the invention will become apparent from the ensuing disclosure in which embodiments of the invention have been described in detail in the specification and illustrated in the accompanying drawings. The invention is deemed to reside in the improved spreader attachments and all modifications as may occur to the skilled artisan with respect to the parts and combinations of parts as set forth in the claims hereto appended.

In the drawings wherein the same reference characters are employed to designate the same or equivalent parts in all of the views:

FIG. 1 is a perspective view of a pressurized container for shaving cream having the improved spreader attachment embodying the invention installed thereon.

FIG. 2 is a partial side elevational view of said container showing the spreader attachment pressed to a position for opening the dispensing valve for discharging shaving cream onto the attachment shown partially in section.

FIG. 3 is a partial side elevational view of the container showing the spreader attachment pressed with a different portion thereof against the dispensing valve.

FIG. 4 is a top perspective view of a modified form of spreader attachment embodying the invention.

Referring to the drawing, the reference character 10 represents generally a preferred embodiment of my novel spreader attachment as shown installed on a pressurized dispensing can in FIG. 1. The can has a conventional cylindrical body 12 provided with a dome 14 at one end thereof capped by the closure 16. Protruding through a suitable opening in the closure 16 is the dispensing nozzle or tube 18 which is of conventional construction. By this is meant that the tube or nozzle 18 is connected to a dispensing valve secured on the interior of the dome 14 below the closure cap 16 and the closed condition of the dispensing valve is indicated by the upright position of tube 18, i.e. normal to the plane of the closure 16. By pressing against the tube 18 in a direction transverse to the longitudinal axis of the tube 18, the tube is canted, as seen in FIG. 3 for instance, to open the dispensing valve and allow pressurized product from the can body 12 to rise into the tube 18 and be discharged from the open end 20 thereof. As stated hereinabove, the pressurized container with its dispensing valve and tube is considered to be conventional. A cover for the tube 18 is shown in phantom outline 22 in FIG. 1.

The spreader attachment 10 has a blade-like part 24 at one end thereof and a substantially cylindrical body portion 26 integral with said part 24 and at the opposite end of the attachment device 10. The portion 26 is split along the length thereof as indicated at 28 and fixedly secured, as by adhesive 30, around the cylindrical body 12 of the can. For this purpose, the length of the portion 26 is selected to reach from the juncture of the dome 14 and body 12 to the bottom 32 of said can.

The blade part 24 is sufficiently long to extend from the upper edge 34 of said part 26 to beyond the open end 20 of tube 18. In its normal condition, said part 24 is curved and extends generally in the same plane as the curved wall of part 34 to which it is attached. In this condition, the part 26 is spaced from the discharge nozzle or tube 18, as seen in FIG. 1, which shows said nozzle 18 in the normal closed condition for the dispensing valve of the container. The upper edge 36 and the opposite lateral edges 38 are serrated for a purpose to be described. The length of edge 36 is very much greater than either of the edges 38. Thus, part 24 can be described as being of curved rectangular configuration connected to the mounting part 26 by the intermediate segment designated 40. However, spreader device 10 is formed as an integral member preferably from a thin sheet of a suitable flexible plastic such as polyvinyl, polyethylene or suitable treated fiber material, and the like. For this construction, it is feasible to die cut the device 10 from a continuous web of material passed through a high speed press with significant economies.

As seen in FIG. 2, the part 24 has been depressed inwardly against the nozzle 18 to cant the same out of the normal vertical position thereof of FIG. 1 whereby to open the valve and allow shaving cream 42 to be discharged against the part 24 along the upper serrated edge 36 thereof. When the part 24 is released, it will return to the normal condition seen in FIG. 1 permitting the nozzle 18 to return also the normal upright position thereof thereby closing the dispensing valve. With cream 42 on the part 24, the user can manipulate the can body 12, which functions as a handle, to spread the cream 42 over his face. The serrations of edge 36 permit the cream to pass through the openings thereby provided for spreading cream on the face. The soft flexible character of device 10 also permits some massage advantages with it.

FIG. 3 shows how a corner or lateral end portion 44 of the device 10 can be bent and pressed against nozzle 18 to open the valve for discharging cream 42 thereonto. The shorter dimension of end portion 44 indicates that this portion can be used advantageously on the neck, upper lip and chin of user for spreading cream thereon.

FIG. 4 shows a modified form of the invention which is identified generally by the reference character 10'. The same reference characters, albeit primed, are used to identify common parts of devices 10 and 10'. The device 10' differs from the device 10 primarily in the full mounting sleeve 50 thereof which is completely circular and is shorter in axial length thereof. The sleeve 50 is designed to permit the device 10' to be installed by sliding the sleeve onto the can body 12. In this way, the device 10' can be removably installed on body 12 as desired.

It is believed that the invention has been described in sufficient detail to enable the skilled artisan to understand and practice the same. Various other changes may occur to the skilled person without departing from the scope of the invention as purported to be delineated by the claims hereto appended. For example, the novel flexible spreader attachment 10 could be readily affixed to a conventional pressurized canister using a vertically reciprocal sprayhead attached to the dispensing valve in place of tiltable tube 18. The relative dimensions of spreader 10 would be modified in accordance with the length of the vertical stroke of such a sprayhead in order for spreader 10 to function satisfactorily in dispensing and applying shaving cream to the user's face.

I claim:

1. In combination with a pressurized shaving cream dispenser container having a cylindrical body capped at one end thereof and through which protrudes a dispensing sprayhead member parallel with the axis of the container, said sprayhead and said valve being in fluid communication, a spreader attachment installed on said body comprising an integral flexible plastic member having a formation at one end thereof engaged on the body and a blade-like formation laterally spaced from and adjacent said dispensing member for discharge of shaving cream from said dispensing member onto said blade and thereafter released to return to its normal position, said can body providing a handle for spreading said cream from the blade-like formation onto the face of a user.

2. The combination of claim 1 in which said attachment has an upper serrated edge.

3. The combination of claim 1 in which said member is capable of being pressed against said dispensing member for opening said valve.

4. The combination of claim 1 in which said attachment has an upper serrated edge and a pair of opposite lateral edges shorter than said upper edge and likewise serrated.

5. In combination with a pressurized shaving cream dispenser container having a cylindrical body capped at one end thereof and through which protrudes a flexible dispensing tube in a normally upright position substantially parallel with the axis of the container in the closed condition of the dispenser valve of the container, said tube and said valve being in fluid communication, a spreader attachment installed on said body comprising an integral flexible plastic member having a substantially cylindrical formation at one end thereof engaged on the body and a blade-like formation at the opposite end thereof normally spaced from said tube, said blade-like formation capable of being pressed against said tube to cant the same for opening said valve to discharge shaving cream thereagainst and thereafter released to close said valve, said can body providing a handle for spreading said cream from the blade-like formation onto the face of a user.

6. The combination of claim 5 in which said attachment has an upper serrated edge.

7. The combination of claim 6 in which said attachment has an upper serrated edge and a pair of opposite lateral edges shorter than said upper edge and likewise serrated.

No references cited.

CHARLES A. WILLMUTH, *Primary Examiner.*

S. E. BECK, *Assistant Examiner.*